United States Patent
Kramer et al.

(10) Patent No.: US 12,509,160 B2
(45) Date of Patent: Dec. 30, 2025

(54) VEHICLE ROOF HAVING A ROOF CLADDING ARRANGEMENT AND ENVIRONMENT SENSOR

(71) Applicant: Webasto SE, Stockdorf (DE)

(72) Inventors: Andrea Kramer, Stockdorf (DE); Alexander Kilias, Stockdorf (DE); Bernhard Schieder, Stockdorf (DE); Dirk Legler, Stockdorf (DE); Michael Deppe, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 381 days.

(21) Appl. No.: 18/246,541

(22) PCT Filed: Oct. 20, 2021

(86) PCT No.: PCT/EP2021/079105
§ 371 (c)(1),
(2) Date: Mar. 24, 2023

(87) PCT Pub. No.: WO2022/084396
PCT Pub. Date: Apr. 28, 2022

(65) Prior Publication Data
US 2023/0339545 A1    Oct. 26, 2023

(30) Foreign Application Priority Data
Oct. 23, 2020  (DE) .......................... 102020127916.7

(51) Int. Cl.
*B62D 25/06*   (2006.01)
*B60R 11/04*   (2006.01)
(Continued)

(52) U.S. Cl.
CPC .............. *B62D 25/06* (2013.01); *B60R 11/04* (2013.01); *G01S 13/931* (2013.01); *G01S 17/931* (2020.01)

(58) Field of Classification Search
CPC ..... B62D 25/06; G01S 13/931; G01S 17/931; B60R 11/04
(Continued)

(56) References Cited

U.S. PATENT DOCUMENTS 10,435,077 B2   10/2019  Schmidt
10,514,303 B2   12/2019  Krishnan et al.
(Continued)

FOREIGN PATENT DOCUMENTS

DE   102016006039 A1   11/2016
DE   202017101968 U1   9/2017

OTHER PUBLICATIONS

International Search Report for PCT/EP2021/079105 mailed Jan. 12, 2022, in English and German (6 pages).
(Continued)

*Primary Examiner* — Dennis H Pedder
(74) *Attorney, Agent, or Firm* — Fitch, Even, Tabin & Flannery, LLP

(57) ABSTRACT

A vehicle roof, in particular of a passenger car, having a roof cladding arrangement and a roof substructure, which is at least partially covered by the roof cladding arrangement, and at least one environment sensor for charting a vehicle environment and another electrical installation for emitting and/or receiving electromagnetic radiation, characterized in that the roof cladding arrangement comprises a visor which has a groove-free outer visible surface, in that the environment sensor and the other electrical installation are disposed beside each other or above one another behind and/or below the visor and in that the visor has a first transmission area having a first transmission behavior for the environment sensor and a second transmission area having a second
(Continued)

transmission behavior for the other electrical installation, the second transmission behavior differing from the first transmission behavior.

15 Claims, 5 Drawing Sheets

(51) Int. Cl.
    *G01S 13/931*     (2020.01)
    *G01S 17/931*     (2020.01)

(58) Field of Classification Search
    USPC .......................................................... 296/210
    See application file for complete search history.

(56) References Cited

U.S. PATENT DOCUMENTS

| | | | |
|---|---|---|---|
| 2017/0305242 A1 | 10/2017 | Gallagher et al. | |
| 2017/0369003 A1* | 12/2017 | Williams | ................ B60R 11/04 |
| 2018/0037267 A1* | 2/2018 | Williams | .............. G01S 7/4813 |
| 2018/0037268 A1* | 2/2018 | Moore | .................. G01S 7/4813 |

OTHER PUBLICATIONS

German Office Action from a related Application No. 10 2020 127 916.7; mailed Jul. 12, 2021; In Germen with Machine Translation into English (7 pages).
International Preliminary Report on Patentability for PCT/EP2021/079105; mailed Apr. 13, 2023 in English (7 pages).

* cited by examiner

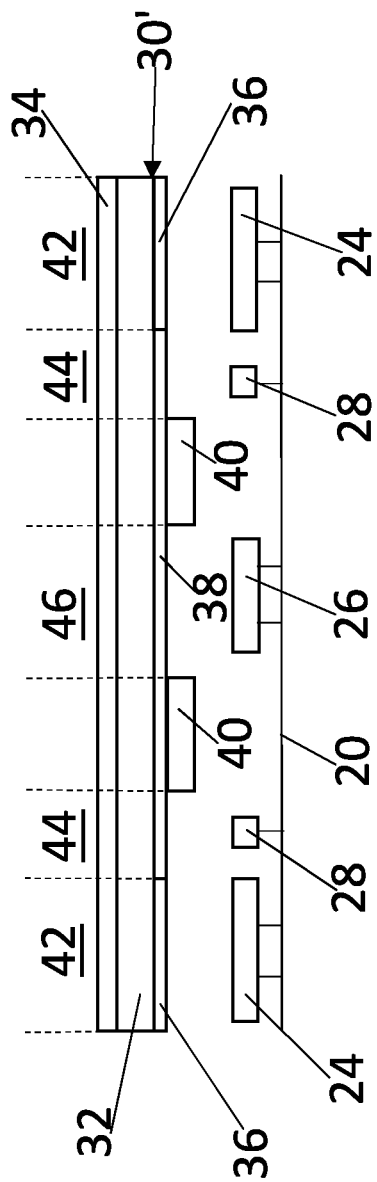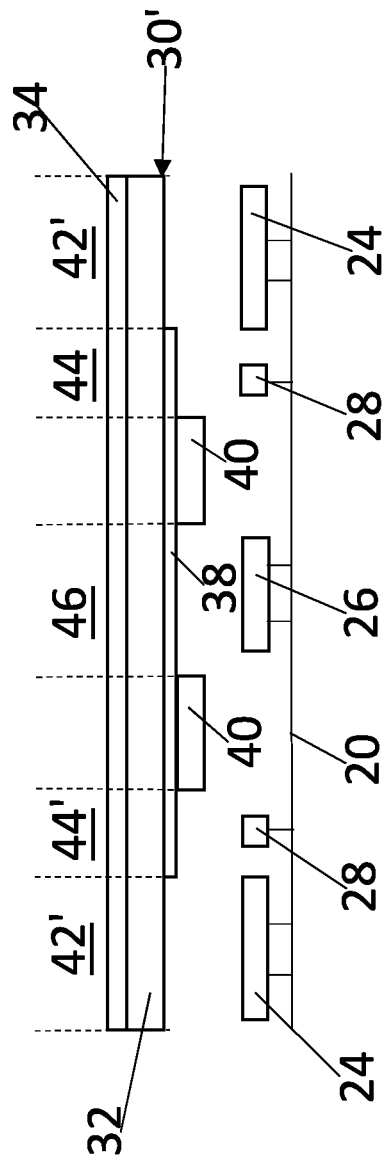

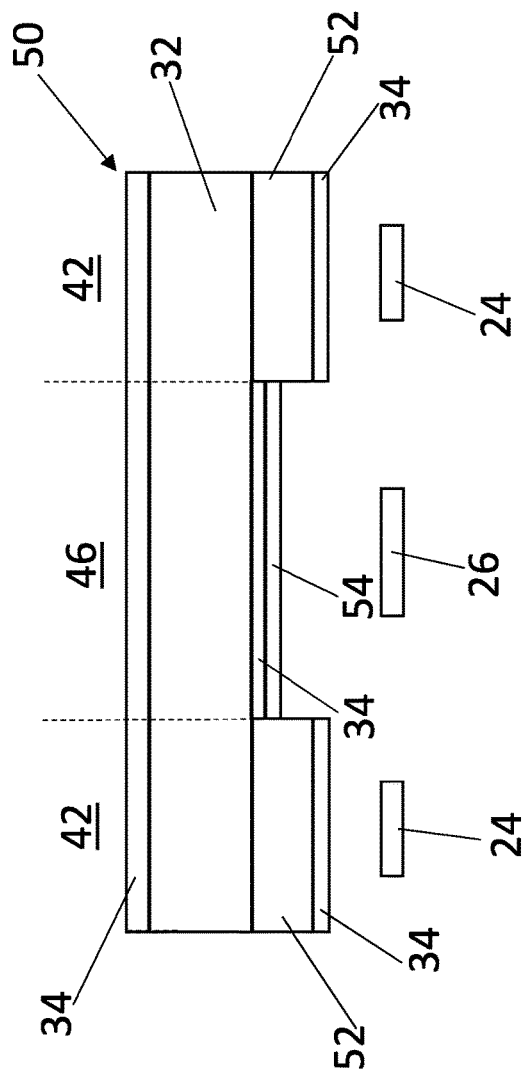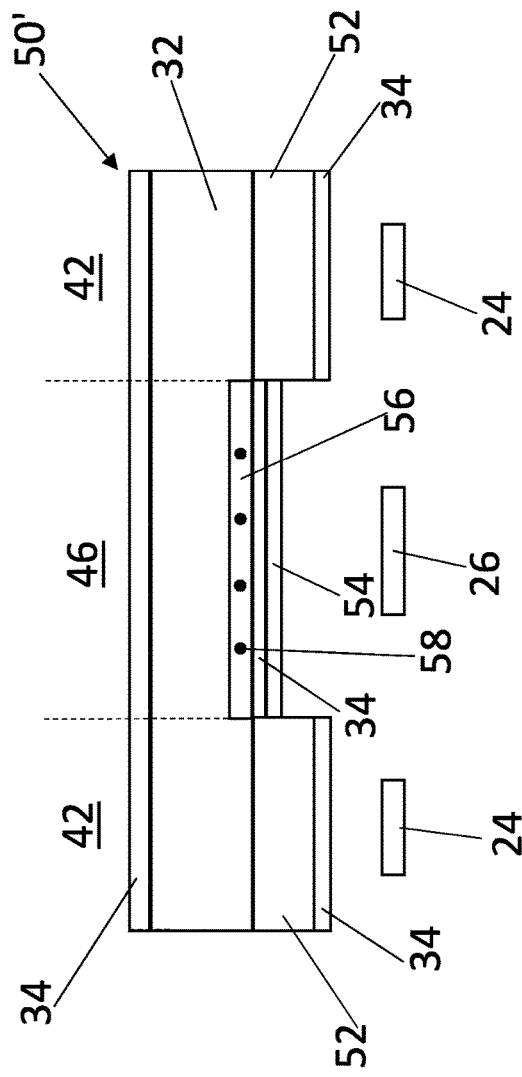

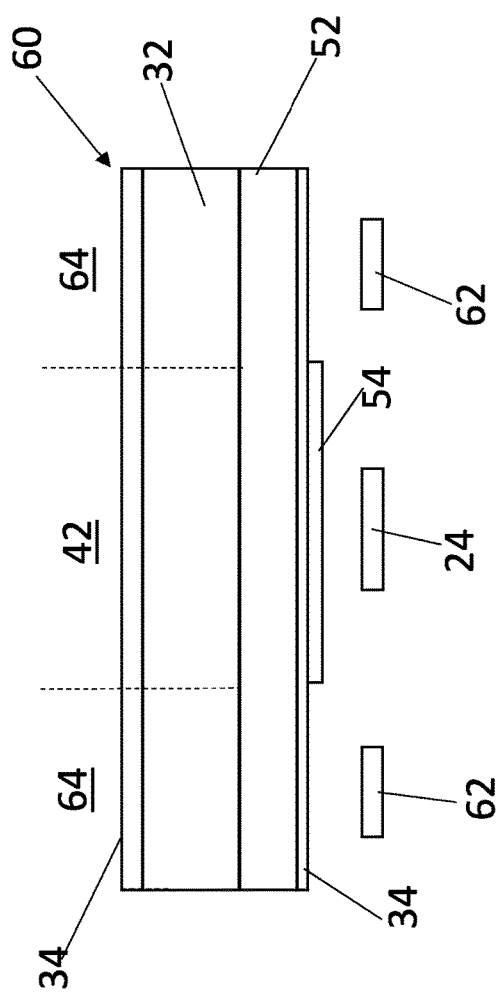
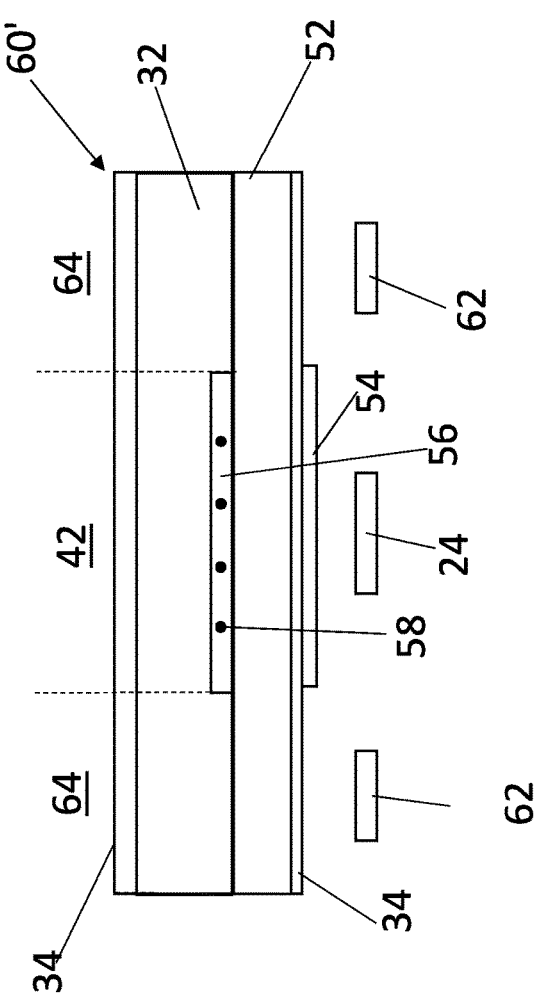

VEHICLE ROOF HAVING A ROOF CLADDING ARRANGEMENT AND ENVIRONMENT SENSOR

CROSS-REFERENCE TO RELATED APPLICATIONS

This application is a U.S. national phase application filed under 35 U.S.C. § 371 of International Application No. PCT/EP2021/079105, filed Oct. 20, 2021, designating the United States, which claims priority from German Patent Application Number 10 2020 127 916.7, filed on Oct. 23, 2020, which are hereby incorporated herein by reference in their entirety for all purposes.

FIELD

The invention relates to a vehicle roof, in particular a vehicle roof of a passenger car, comprising the features of the preamble of claim 1.

BACKGROUND

A vehicle roof of this kind is known from practice and can also be configured as a roof module, which can be placed on top of a vehicle chassis of a passenger car, which forms a vehicle carcass, as a separate structural part. To connect the roof module, the vehicle chassis comprises roof beams, which can extend in the longitudinal and transverse direction and serve as a support unit for the roof module. The roof module comprises a roof substructure, which forms an intersection to the roof beams, and a roof cladding, which covers the roof substructure. Furthermore, the roof module can comprise a roof opening, which can be optionally closed or at least partially released by means of a roof opening system, which comprises a displaceable lid element. Moreover, the roof cladding arrangement can be designed to be transparent at least in areas so that light can fall into a vehicle interior of the vehicle in question via the vehicle roof. In order to allow autonomous or partially autonomous driving of the motor vehicle in question, the known vehicle roof has sensor technology, which comprises several sensor modules which each have at least one environment sensor for charting the vehicle environment. The environment sensors are connected to a control unit which in turn is connected to a control of the vehicle in question, meaning the driving behavior of the vehicle can be influenced as a function of the signals from the environment sensors.

In hitherto existing vehicles, the sensor modules are placed on top of in particular the roof cladding arrangement, meaning they are the highest point of the vehicle in question and have a good view of the vehicle environment. However, placing the sensor modules on the roof cladding arrangement creates a vehicle appearance which does not meet client requirements. Moreover, the aerodynamic properties of the vehicle are negatively impacted by the sensor module placed on top of the roof cladding arrangement.

SUMMARY

The object of the invention is to create a vehicle roof of the type mentioned above, in which the environment sensor is integrated in the roof design and whose appearance meets high visual demands.

According to the invention, this object is attained by the vehicle roof having the features of claim 1.

The vehicle roof according to the invention is therefore in particular a vehicle roof of a passenger car and comprises a roof cladding arrangement and a roof substructure which is at least partially covered by the roof cladding arrangement. Furthermore, the vehicle roof has at least one environment sensor for charting a vehicle environment and another electrical installation for emitting and/or for receiving electromagnetic radiation. The roof cladding arrangement comprises a visor having a groove-free outer visible surface, the environment sensor and the other electrical installation being disposed beside each other or above one another behind and/or below the visor and the visor having a first transmission area having a first transmission behavior for the environment sensor and a second transmission area having a second transmission behavior for the other electrical installation. The visor designed in the sense of the invention meets requirements pertaining to the optical appearance owing to its groove-free design on the visible surface facing the vehicle environment. Moreover, the environment sensor and the other electrical installation are screened by the visor, which is a component of the roof cladding arrangement, so that these two components of the vehicle roof are integrated in such a manner in the roof design that they will not impair the aerodynamics of the vehicle in question. Furthermore, the visor is adapted specifically to the environment sensor and the other electrical installation, as the first transmission area has a transmission behavior, which is configured such to fulfill its purpose that the electromagnetic radiation used by the environment sensor can pass through the first transmission area at least essentially without disturbance, i.e., free of absorption or reflection. Accordingly, the second transmission is adapted to the other electrical installation via its transmission behavior, which differs from the first transmission behavior, i.e., the electromagnetic radiation used by the other electrical installation can pass the second transmission area of the visor at least essentially without disturbance. At the visor, several areas are formed which are construed specifically for the electrical components of the vehicle roof, which each use electromagnetic radiation having a specific wavelength. The transmission areas are adapted to the correspondingly used electromagnetic radiation. The groove-free smooth design of the outer visible surface allows presenting a transition-free appearance of the different transmission areas to the viewer. In particular, the visible surface is tier-less.

Transmission behavior in the present instance is understood to be the optical properties of the corresponding area of the visor, namely in particular regarding the absorbency and/or reflectivity for certain wavelengths and/or the permeability for radiation having certain wavelengths and/or also the general reflection behavior at the visor's inner side and the visor's outer side.

In a preferred embodiment of the vehicle roof according to the invention, the visor has a support, whose base area corresponds in particular, at least mostly, to a visor base area and is entirely permeable to radiation having the wavelengths which are used by the environment sensor and by the other electrical installation. In this case, the support, which preferably determines the appearance of the outer visible surface of the visor and thus can form what is known as a top layer, is transparent for all required wavelengths used by the environment sensor and the other electrical installation.

The support is preferably a glass support or a plastic support, which can in particular comprise a polycarbonate material and/or PMMA material.

The environment sensor of the vehicle roof according to the invention can be designed in various manners and uses electromagnetic radiation for charting the vehicle environment. For instance, the environment sensor comprises a lidar sensor, a radar sensor, an optical sensor, such as a camera, which can be configured as a stereo camera, or the like.

The other electrical installation is also in particular configured as an environment sensor for emitting and/or for receiving electromagnetic radiation and is, for example, a lidar sensor, a radar sensor, an optical sensor, such as a camera, and/or the like. It is also conceivable for the other electrical installation to comprise a signaling light, which indicates an operating mode of the vehicle in question and in particular is what is known as an ADS (autonomous driving signal), and/or at least one antenna module. The second transmission area assigned to the other electrical installation in question then has a transmission behavior which is adapted to the wavelengths used by this electrical installation.

If the environment sensor and/or the other electrical installation is a lidar sensor, it preferably functions in a wavelength range of approximately 905 nm+/−50 nm or of approximately 1,550 nm+/−50 nm. A camera used as an environment sensor or other electrical installation can function in the wavelength range of visible light and/or in the infrared range. A signaling light functions with the wavelengths of visible light. A radar sensor functions in particular with frequencies between 24 gigahertz and 78 gigahertz, i.e., with wavelengths in the millimeter range.

To define the different transmission areas of the visor, the support has at least one coating in particular on its side facing away from the visible surface in a preferred embodiment of the vehicle roof according to the invention, the coating being impermeable to electromagnetic radiation in a specific wavelength range. The coating extends only across, for example, a partial surface assigned to one of the transmission areas. In an embodiment where the visor comprises three or more transmission areas, a specific coating can also be assigned to two transmission areas. In particular for a tiered support, areas of the coating can be disposed on the side of the carrier facing towards the vehicle environment for forming the groove-free smooth visible surface.

The coating reflects and/or absorbs infrared radiation, for example. A coating of this kind can also extend across the entire base surface of the support and/or the visor as it reduces the heat input in the vehicle roof and thus also in a vehicle interior.

In order to be able to design the visor to be non-transparent in certain areas, it can be advantageous for the coating disposed on the side of the carrier facing away from the visible surface to essentially be permeable to visible light, i.e., for wavelengths in the range between 400 nm and 800 nm. Simultaneously, this coating can be transparent for wavelengths a lidar sensor uses and/or for the wavelengths a radar sensor uses.

The coating, which is applied to the support of the visor, can be realized in different manners. It is conceivable for the coating to be realized as a film. Alternatively, the coating can be made of an injection-molded section. This is in particular advantageous if the visor is a multicomponent injection-molded part, for which a first plastic material component forms the support and a second plastic material component forms the coating in the form of the injection-molded section. It is also conceivable, of course, for the multicomponent injection-molded part to have another material component as a coating in a partial area, the other material component then defining the other transmission area. The different material components allow realizing the different transmission behaviors of the transmission areas.

In another alternative embodiment of the vehicle roof according to the invention, the coating comprises a paint, which is impermeable to electromagnetic radiation of certain wavelengths.

The coating can also be made of a vapor deposit coating or a sputter layer, which is applied on the support.

When forming several coatings on the support, they can also be applied in different manners.

In order to be able to prevent any freezing or even condensation of the visor in at least one of the transmission areas, at least one of the transmission areas of the visor comprises a heating apparatus, which preferably can be activated as required, in a special embodiment of the vehicle roof according to the invention.

The heating apparatus can be a panel heating, which is embedded in one of the materials of the visor. The heating apparatus can also comprise a film, which forms the panel heating. The film is connected to the support or the coating of the visor. Moreover, the heating apparatus can comprise at least one heating wire, which is embedded in the film or even directly in a material of the visor.

To protect the visor from becoming scratched or from other damage, the visor can have a protective layer in the form of a scratch-proof coating (hard coat) on the visible surface and/or on the side facing away from the visible surface.

A preferred embodiment of the vehicle roof according to the invention is designed as a roof module. A roof module forms a separate structural unit in an integrated manner, components required for autonomously or partially autonomously driving the vehicle in question being housed in the structural unit independently of the remaining vehicle design. The structural unit, which defines the roof's appearance and can have an inner roof lining, can be connected as a whole to a vehicle chassis or a vehicle carcass by a vehicle manufacturer, the vehicle chassis or vehicle carcass being able to comprise roof beams, such as lateral roof beams and transverse roof beams, as an interface to the roof module. The roof designed as a roof module represents a roof sensor module (RSM), which enables autonomously or partially autonomously driving the vehicle in question, via the integration of the sensor technology in the form of an environment sensor and via the integration of the other electrical installation.

The vehicle, which is equipped with the vehicle roof according to the invention and is an autonomously driving vehicle, drives autonomously in the autonomous driving mode at least without any significant intervention by a driver or user. In a partially autonomous driving mode, the vehicle roof according to the invention forms at least a part, for example, of a driver assistance system.

The vehicle roof according to the invention can be further provided with a transparent fixed-roof section, which is part of the roof cladding arrangement, and/or with a roof opening system for a roof opening, which is limited by the roof cladding arrangement.

In particular, the vehicle roof according to the invention is a roof of a passenger car. However, it can also be a roof of a utility vehicle, which is designed as a delivery vehicle, a bus, an autonomously driving minibus, a so-called people mover, or a road train.

The subject matter of the invention is also a motor vehicle, which comprises a vehicle roof of the type mentioned above and with which a roof module can be placed on top of an otherwise roof-free vehicle chassis, the roof module being configured as what is known as a roof sensor module.

Further advantages and advantageous embodiments of the subject matter of the invention can be derived from the description, the drawing and the patent claims.

BRIEF DESCRIPTIONS OF THE DRAWINGS

Exemplary embodiments of the subject matter of the invention are shown in a schematically simplified manner in the drawing and are described in further detail in the following description.

FIG. 2 shows a schematic longitudinal cut through a visor of the vehicle roof;

FIG. 3 shows a schematic longitudinal cut through an alternative embodiment of a visor of the type shown in FIG. 2;

FIG. 4 shows a cut through a third embodiment of a visor;

FIG. 5 shows a cut through a fourth embodiment of a visor;

FIG. 6 shows a cut through a fifth embodiment of a visor;

FIG. 7 shows a cut through a sixth embodiment of a visor;

DETAILED DESCRIPTION

Figure 1:
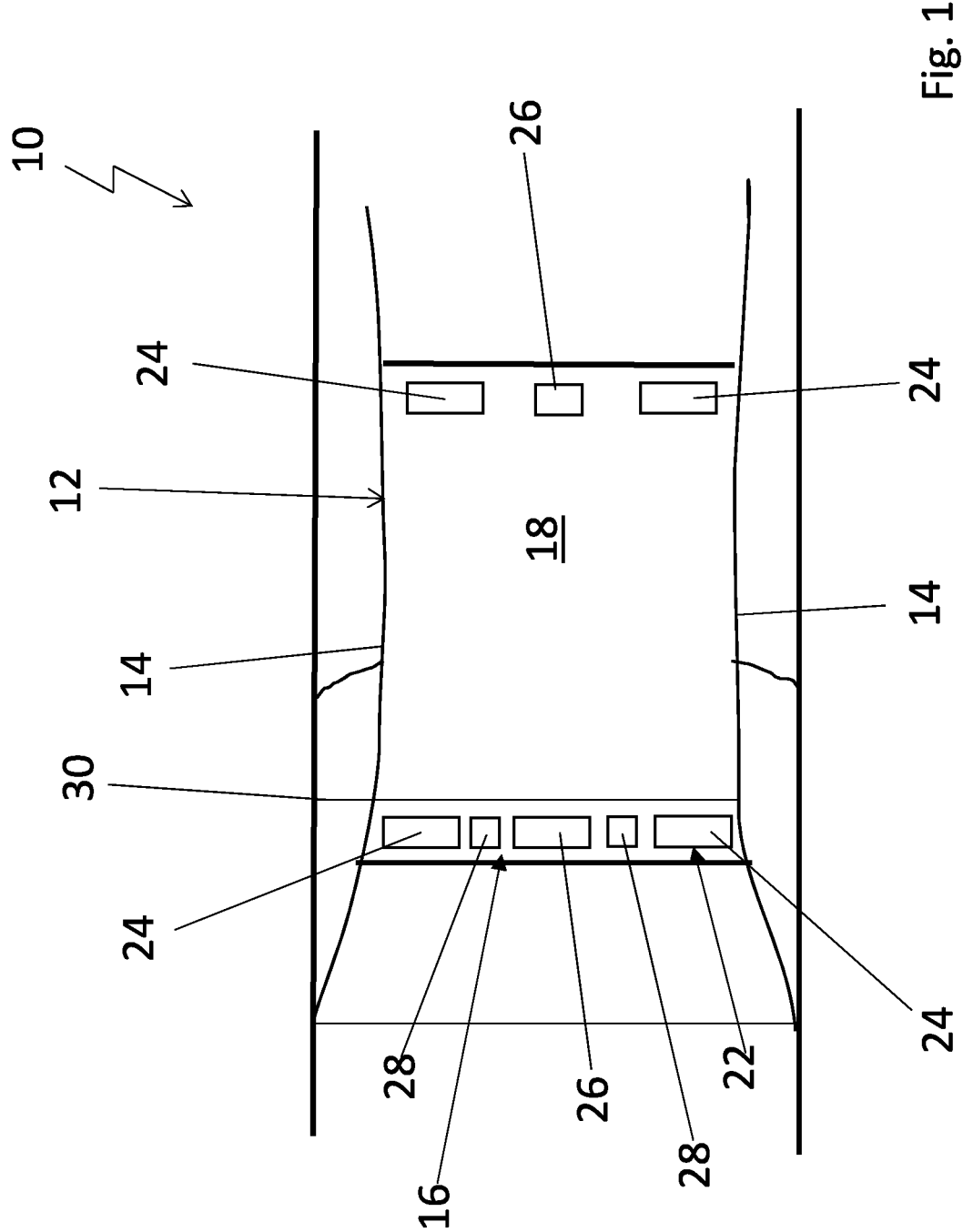
FIG. 1 shows a schematic top view of a motor vehicle having a vehicle roof according to the invention.

In FIGS. 1 and 2, a motor vehicle 10 is shown, which is designed as a passenger vehicle and has a vehicle roof 12 which comprises a lateral roof beam 14 on both sides with respect to a longitudinal roof center plane, lateral roof beams 14 being components of a vehicle chassis representing a carcass. A roof module 16, which is tightly connected to lateral roof beams 14 to form vehicle roof 12, is disposed between lateral roof beams 14.

Roof module 16, which forms a separate structural unit of the vehicle design, comprises a roof cladding arrangement 18 and a roof substructure 20, which can be designed as a roof frame and can form an interface of roof module 16 to lateral roof beams 14.

Roof module 16 is a roof sensor module 16, which has devices which enable autonomously driving motor vehicle 10. For this purpose, roof module 16 has sensor technology 22 comprising several environment sensors 22 which are each configured as lidar sensors 24 in particular in the four corner areas of roof module 16 and as cameras 26 in a central area in the rear and front. By means of these environment sensors, the vehicle environment can be charted for implementing autonomously driving motor vehicle 10. By evaluating the measuring signals of the environment sensors by means of an evaluation and control apparatus of motor vehicle 10, a respective traffic situation can be determined according to which motor vehicle 10 autonomously adapts its driving behavior. Both lidar sensors 24 and cameras 26 are disposed below roof cladding arrangement 18.

In order to be able to indicate the driving mode of motor vehicle 10, roof module 16 has a signaling light 28 in the form of what is known as an ADS (autonomous driving signal) between lidar sensors 24 disposed in the front and cameras 26 disposed in the central front in each instance.

Roof cladding arrangement 18 comprises a front visor 30 extending in the transverse vehicle direction, both front lidar sensors 24, camera 26 disposed centrally in the front and both front signaling lights 28 being disposed below visor 30 which has a groove-free visible surface on the side facing the vehicle environment.

Visor 30, shown in detail in FIG. 2, comprises a carrier 32 made of a plastic layer made of a polycarbonate material.

On the side facing the vehicle environment, support 32 is provided with a contiguous hard-coat or scratch-proof coating 34, which protects carrier 32 from damage and forms an outer groove-free visible surface of visor 30. When formed without a scratch-proof coating, the support, which can also be made of glass or a different plastic material, forms the groove-free visible surface.

The entire area of support 32 is permeable to electromagnetic radiation having the wavelengths used by lidar sensors 24, camera 26 and signaling lights 28.

On the inner side of support 32, i.e., on the side facing away from scratch-proof coating 34, a film 36 is affixed in the area of each lidar sensor 24 for forming a coating, film 36 having a transparency for electromagnetic radiation which is in a wavelength range between 850 nm and 950 nm. Via films 36, first transmission areas 42 of visor 30 are consequently defined, the transmission behavior of transmission areas 42 being adapted to the wavelengths which are used by lidar sensors 24, i.e., wavelengths of 905 nm+1-50 nm. Between both films 36, a film 38 is affixed on the inner side of support 32 for forming another coating, film 38 being permeable to visible light but blocking infrared radiation. In particular, film 38 is impermeable to electromagnetic radiation having wavelengths between 780 nm and 2,500 nm. On the side facing away from support 32, film 38 is provided with an opaque or non-transparent coating in each instance in the areas between signaling lights 28 and camera 26. Second transmission areas 44 and 46 remain for signaling lights 28 and cameras 26 each, transmission areas 44 and 46 having a transmission area adapted to camera 26 and signaling lights 28.

Signaling lights 28 each represent another electrical installation in the sense of the invention for which a second transmission area 44 is provided at visor 30.

In FIG. 3, a visor 30' is shown, which is a visor of a roof cladding arrangement of the type shown in FIG. 1 and behind which two lidar sensors 24, a camera 26 and two signaling lights 28, which are disposed on a roof substructure, are also disposed according to the embodiment according to FIGS. 1 and 2. Visor 30' largely corresponds to the visor according to FIGS. 1 and 2, though it differs in the respect that it forms first transmission areas 42' for lidar sensors 24, transmission areas 42' not supporting coatings, which block electromagnetic radiation of certain wavelengths, on the inner side of one-piece support 32. Rather, support 32 does not have coatings on the inner side in first transmission areas 42'.

The remaining features of visor 30' correspond to those according to FIGS. 1 and 2, for which reason reference is made to the description above.

In FIG. 4, a visor 50 is shown which is realized as a multicomponent injection-molded part and is a component of a roof cladding arrangement in the form of a front visor in the manner shown in FIG. 1. Behind visor 50, two lidar sensors 24 and a camera 26 are disposed. Visor 50 is a two-component injection-molded part, a first component forming a support 32 from a polycarbonate material as transparent as glass, the base area of support 32 corresponding at least essentially to the visor base area. Support 32 has a contiguous outer side which is free of tiers and grooves, faces the vehicle environment and is provided with a scratch-proof coating 34. Injection-molded sections 52 are molded onto the inner side, injection-molded sections 52 being made of a second injection-molded component, which comprise an opaque, black polycarbonate material. Injection-molded sections 52, which are to be viewed as a coating of support 32, are transparent for lidar sensors 24 and are permeable to the electromagnetic radiation used by lidar sensors 24. In the area between both injection-molded sections 52, support 32 is provided with an anti-reflection coating 54 or with an anti-reflection structure. Furthermore, visor 50 is provided with a scratch-proof coating 34, which serves as a protective layer, on its inner side.

Visor 50 forms a first transmission area 42 for each lidar sensor 24, the base surface of transmission area 42 being defined by the base surface of corresponding injection-molded section 52 and having a transmission behavior adapted to the wavelength range used by lidar sensors 24. Between injection-molded sections 52, visor 50 forms a second transmission area 46, which has a transmission behavior adapted to camera 26, meaning it is permeable to visible light.

In FIG. 5, a visor 50' is shown, which corresponds essentially to the visor of FIG. 4, though it differs in the respect that it has a polycarbonate film 56 in second transmission area 46, heating wires 58 being embedded in polycarbonate film 56 which is an insert of the first injection-molded component forming support 32.

The remaining features of visor 50' correspond to those according to FIG. 4.

In FIG. 6, a visor 60 is shown, which is also a visor of a roof cladding arrangement of the type shown in FIG. 1 and behind which a lidar sensor 24 and two radar sensors 62 are disposed. Visor 60 comprises a support 32, whose base surface corresponds to the base surface of visor 60 and which is made of a highly transparent polycarbonate material, which has the transparency of glass and represents a first injection-molded component. Support 32 is provided with a scratch-proof coating 34 which is on its groove-free outer side and forms a groove-free visible surface. On its inner side, the entire surface of support 32 is provided with an opaque injection-molded section 52. Injection-molded section 52, which is made of a second injection-molded component, has a scratch-proof coating 34 as a protective layer on its inner side. In the area of lidar sensor 24, an anti-reflection coating 54 is applied on the inner side of visor 60, anti-reflection coating 54 defining a first transmission area 42 of visor 60. In the adjoining areas, which are free of anti-reflection coating 54, visor 60 forms second transmission areas 64, which are adapted to the electromagnetic radiation used by radar sensors 62 and whose transmission behavior differs from the transmission behavior of first transmission area 42 via the lack of the anti-reflection coating.

In FIG. 7, a visor 60' is shown, which largely corresponds to the one according to FIG. 6 but differs in the respect that it has an additional polycarbonate film 56 having embedded heating wires 58 in first transmission area 42, heating wires 58 being embedded in injection-molded section 52 when producing visor 60' representing the two-component injection-molded part. On the side facing away from support 32, polycarbonate film 56 supports anti-reflection coating 54.

The remaining features of visor 60' correspond to those according to FIG. 6, for which reason reference is made to the description.

Figure 8:
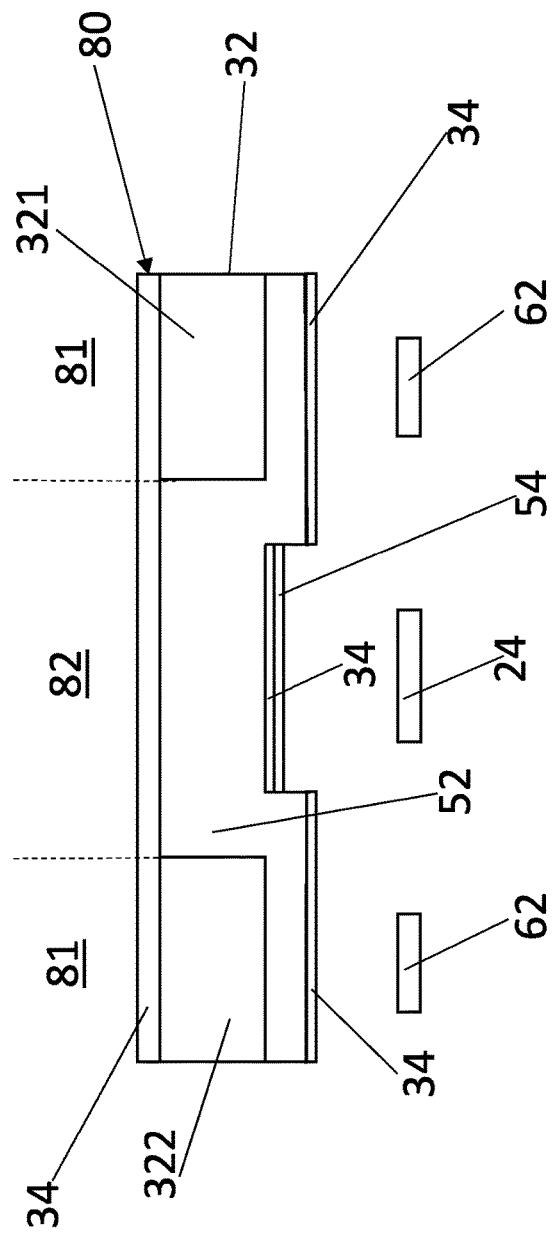
FIG. 8 shows a cut through a seventh embodiment of a visor.

In FIG. 8, a visor 80 is shown, which is also a visor of a roof cladding arrangement of the type shown in FIG. 1. Visor 80 comprises an injection-molded section 52, which is made of a highly transparent polycarbonate material having the transparency of glass and is made of a first partial section 521 and a second partial section 522. Both partial sections 521 and 522 are separated from each other by a support 32, whose outer surface is formed so that it is flush with the outer sides of partial sections 521 and 522. Support 32 is tiered and engages over partial sections 521 and 522 of injection-molded section 52 at their inner sides. Via partial sections 521 and 522, a first transmission area of visor 80 is defined in each instance, which differs from a second transmission area 82, which is disposed between both partial sections 521 and 522, regarding the transmission behavior. Visor 80 is provided with a scratch-proof coating 34, which forms the groove-free outer visible surface of visor 80, on its inner side and on its outer side as a protective layer. Moreover, visor 80 has an anti-reflection coating 54 on its inner side in second transmission area 82.

Figure 9:
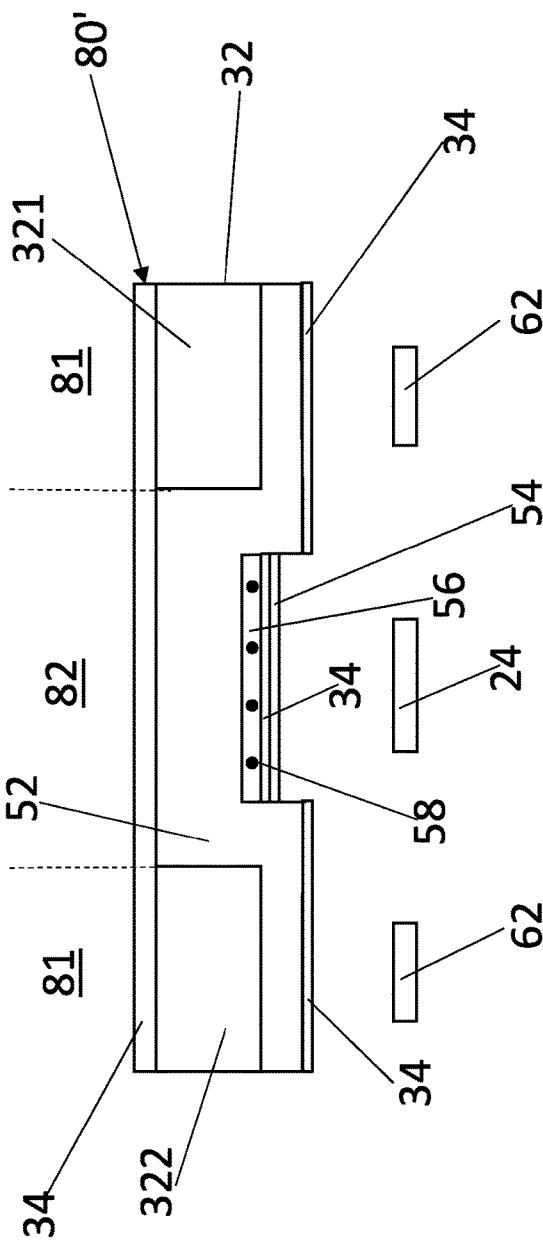
FIG. 9 shows a cut through an eighth embodiment of a visor.

In FIG. 9, a visor 80' is shown, which largely corresponds to the visor shown in FIG. 8, though it differs in the respect that it additionally has a polycarbonate film 56, in which heating wires 58 are embedded, in the area of second transmission area 82. Inner scratch-proof coating 34 and anti-reflection coating 54 engage over polycarbonate film 56.

The remaining features of visor 80' correspond to those according to FIG. 8.

The invention claimed is:

1. A vehicle roof comprising:
   a roof cladding arrangement and a roof substructure, which is at least partially covered by the roof cladding arrangement, and at least one environment sensor for charting a vehicle environment and another electrical installation for emitting and/or receiving electromagnetic radiation,
   wherein the roof cladding arrangement comprises a visor which has a groove-free outer visible surface, wherein the environment sensor and the other electrical installation are disposed beside each other or above one another behind and/or below the visor and wherein the visor has a first transmission area having a first transmission behavior for the environment sensor and a second transmission area having a second transmission behavior for the other electrical installation, the second transmission behavior differing from the first transmission behavior; and
   wherein the visor is a multicomponent injection-molded part and a first plastic material component forms a support and a second plastic material component forms a coating in the form of an injection-molded section.

2. The vehicle roof according to claim 1, wherein the visor has a visor base area with the support, whose entire area is permeable to radiation having the wavelengths used by the environment sensor and by the other electrical installation.

3. The vehicle roof according to the claim 1, wherein the coating is a protective coating, which forms the outer visible surface.

4. The vehicle roof according to the claim 1, wherein the coating is impermeable to electromagnetic radiation in a specific wavelength area, and wherein the coating is disposed on the side of the support facing away from the visible surface.

5. The vehicle roof according to claim 4, wherein the coating reflects and/or absorbs infrared radiation.

6. The vehicle roof according to claim 4, wherein the coating is impermeable to visible light.

7. The vehicle roof according to claim 4, wherein the coating comprises a foil.

8. The vehicle roof according to claim 4, wherein the coating comprises paint.

9. The vehicle roof according to claim 1, wherein at least one of the transmission areas comprises a heating apparatus.

10. The vehicle roof according to claim 9, wherein the heating apparatus comprises panel heating.

11. The vehicle roof according to claim 9, wherein the heating apparatus comprises a foil, which comprises at least one heating wire.

12. The vehicle roof according to claim 1, wherein a protective layer is disposed on the side of the visor facing away from the visible surface.

13. The vehicle roof according to claim 1, wherein it the vehicle roof is a roof module.

14. A motor vehicle, comprising a vehicle roof according to claim 1.

15. The vehicle roof according to the claim 1, wherein the support comprises a polycarbonate material and/or a PMMA material.

* * * * *